United States Patent
Wei (10) Patent No.: US 10,057,850 B2
(45) Date of Patent: Aug. 21, 2018

(54) METHODS FOR DEFERRING COMMUNICATIONS BETWEEN A MOBILE COMMUNICATION DEVICE AND A SERVICE NETWORK

(71) Applicant: Acer Incorporated, New Taipei (TW)

(72) Inventor: Hung-Yu Wei, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 648 days.

(21) Appl. No.: 14/446,596

(22) Filed: Jul. 30, 2014

(65) Prior Publication Data

US 2015/0271176 A1 Sep. 24, 2015

Related U.S. Application Data

(60) Provisional application No. 61/969,364, filed on Mar. 24, 2014.

(51) Int. Cl.

| | | |
|---|---|---|
| *H04L 29/06* | (2006.01) | |
| *H04W 12/08* | (2009.01) | |
| *H04W 52/02* | (2009.01) | |
| *H04W 12/00* | (2009.01) | |

(52) U.S. Cl.
CPC ....... *H04W 52/0225* (2013.01); *H04W 12/00* (2013.01); *H04W 52/0209* (2013.01); *H04L 63/0227* (2013.01); *Y02D 70/1224* (2018.01); *Y02D 70/1262* (2018.01); *Y02D 70/1264* (2018.01); *Y02D 70/142* (2018.01); *Y02D 70/144* (2018.01); *Y02D 70/146* (2018.01);
(Continued)

(58) Field of Classification Search
CPC ............. H04W 52/0225; H04W 12/00; H04W 52/0209; H04L 63/0227; Y02B 60/50
See application file for complete search history.

(56) References Cited

U.S. PATENT DOCUMENTS

2003/0198220 A1* 10/2003 Gross .................. H04L 47/2458
370/389
2008/0240009 A1 10/2008 Min et al.
(Continued)

FOREIGN PATENT DOCUMENTS

| CN | 1379963 A | 11/2002 |
|---|---|---|
| CN | 101542920 A | 9/2009 |

(Continued)

OTHER PUBLICATIONS

Long, W.K., et al.; "Unveiling the Hidden Dangers of Public IP Addresses in 4G/LTE Cellular Data Networks".
(Continued)

*Primary Examiner* — Qun Shen
(74) *Attorney, Agent, or Firm* — McClure, Qualey & Rodack, LLP (57) ABSTRACT

A mobile communication device including a wireless module and a controller module is provided. The wireless module performs wireless transmission and reception to and from a service network. The controller module determines an operation state of the mobile communication device when detecting a data packet to be transmitted to the service network via the wireless module, and defers transmission of the data packet according to the operation state and one or more parameters of the data packet.

28 Claims, 8 Drawing Sheets

(52) U.S. Cl.
CPC ............ *Y02D 70/162* (2018.01); *Y02D 70/21* (2018.01); *Y02D 70/23* (2018.01); *Y02D 70/24* (2018.01)

(56) References Cited

U.S. PATENT DOCUMENTS

| | | | | |
|---|---|---|---|---|
| 2008/0267140 | A1* | 10/2008 | Lee | H04L 5/0007 370/337 |
| 2009/0175186 | A1* | 7/2009 | Du | H04W 76/28 370/252 |
| 2010/0061662 | A1* | 3/2010 | Hubner | G08B 13/19621 382/305 |
| 2010/0205671 | A1* | 8/2010 | Milliken | G06F 21/562 726/23 |
| 2011/0037603 | A1* | 2/2011 | Egawa | G08B 17/00 340/636.1 |
| 2012/0137366 | A1* | 5/2012 | O'Rourke | H04L 63/0227 726/23 |
| 2013/0194991 | A1* | 8/2013 | Vannithamby | H04L 5/0035 370/311 |
| 2013/0250337 | A1* | 9/2013 | Inoue | H04N 1/00896 358/1.13 |
| 2013/0260740 | A1* | 10/2013 | Rayavarapu | H04W 76/046 455/422.1 |
| 2013/0265924 | A1* | 10/2013 | Kim | H04W 52/0235 370/311 |
| 2013/0315121 | A1* | 11/2013 | Sampathkumar | H04W 52/0216 370/311 |
| 2014/0051485 | A1* | 2/2014 | Wang | H04W 4/70 455/574 |
| 2014/0146722 | A1* | 5/2014 | Azizi | H04L 69/22 370/311 |

FOREIGN PATENT DOCUMENTS

| | | |
|---|---|---|
| CN | 103430490 A | 12/2013 |
| WO | WO 2012/121784 | 9/2012 |

OTHER PUBLICATIONS

Chinese language office action dated Mar. 15, 2016, issued in application No. TW 104102208.

Chinese language office action dated Nov. 27, 2017, issued in application No. CN 201510069203.0.

* cited by examiner

METHODS FOR DEFERRING COMMUNICATIONS BETWEEN A MOBILE COMMUNICATION DEVICE AND A SERVICE NETWORK

CROSS REFERENCE TO RELATED APPLICATIONS

This Application claims priority of U.S. Provisional Application No. 61/969,364, filed on Mar. 24, 2014, the entirety of which is incorporated by reference herein.

BACKGROUND OF THE INVENTION

Field of the Invention

The invention generally relates to wireless communications, and more particularly, to methods for deferring communications between a mobile communication device and a service network, so as to save power and defend against battery draining attacks on the mobile communication device.

Description of the Related Art

With growing demand for ubiquitous computing and networking, various wireless technologies have been developed, such as Short Range Wireless (SRW) technologies and cellular technologies. The SRW technologies include Wireless Fidelity (WiFi) technology, Bluetooth technology, and Zigbee technology. The cellular technologies include Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, and Time-Division LTE (TD-LTE) technology. By employing one of the wireless technologies, a mobile communication device may wirelessly connect to the Internet or a service network for data services anytime and anywhere.

However, when connecting to the Internet or any service network, the mobile communication device may be assigned a private or public Internet Protocol (IP) address and become reachable through the IP address, thereby causing the mobile communication device to become a potential target for malicious attacks, such as port scanning attacks, Denial of Service (DoS) flooding attacks, and battery draining attacks. Generally, an attacker aims to drain the power from the mobile communication device by constantly sending malicious data packets to the mobile communication device to keep it awake. On the other hand, some installed applications may frequently attempt to send small data packets, such as keep-alive messages, status-update messages, or query messages, and this inevitably causes the mobile communication device to frequently exit the low power state.

Since the power in a mobile communication device is provided by a battery, the power capacity is rather limited. Thus, it is desirable to have an energy-efficient way of communication management for a mobile communication device.

BRIEF SUMMARY OF THE INVENTION

In order to solve the aforementioned problem, the invention proposes to defer the transmissions of low-priority and/or suspicious data packets to and from a mobile communication device, so as to prolong the battery life of the mobile communication device and to defend against battery draining attacks on the mobile communication device.

In the first aspect of the invention, a mobile communication device is provided. The mobile communication device comprises a wireless module and a controller module. The wireless module is configured to perform wireless transmission and reception to and from a service network. The controller module is configured to determine an operation state of the mobile communication device when detecting a data packet to be transmitted to the service network via the wireless module, and to defer transmission of the data packet according to the operation state and one or more parameters of the data packet.

In the second aspect of the invention, a method for a mobile communication device to defer communications with a service network is provided. The method comprises the steps of: determining an operation state of the mobile communication device when detecting a data packet to be transmitted to the service network; and deferring transmission of the data packet according to the operation state and one or more parameters of the data packet.

In the third aspect of the invention, a service network is provided. The service network comprises an access network and a core network. The access network comprises at least a cellular station for performing wireless transmission and reception to and from a mobile communication device. The core network is configured to determine an operation state of the mobile communication device when detecting a data packet to be transmitted to the mobile communication device via the access network, and to defer transmission of the data packet according to the operation state and one or more parameters of the data packet.

In the fourth aspect of the invention, another service network is provided. The service network comprises an access network and a core network. The access network comprises at least a cellular station for performing wireless transmission and reception to and from a mobile communication device. The core network is configured to receive a data packet to be transmitted to the mobile communication device. The access network is further configured to determine an operation state of the mobile communication device in response to the core network receiving the data packet, and to defer transmission of the data packet according to the operation state and one or more parameters of the data packet.

In the fifth aspect of the invention, a method for a service network to defer communications with a mobile communication device is provided. The method comprises the steps of: determining an operation state of the mobile communication device when detecting a data packet to be transmitted to the mobile communication device; and deferring transmission of the data packet according to the operation state and one or more parameters of the data packet.

In the sixth aspect of the invention, a proxy server is provided. The proxy server comprises a connection module and a controller module. The connection module is configured to provide communications with a service network which is wirelessly connected to a mobile communication device. The controller module is configured to receive, from the service network via the connection module, an operation state of the mobile communication device and a data packet to be transmitted from the service network to the mobile communication device, and to determine whether to defer the transmission of the data packet according to the operation state and one or more parameters of the data packet.

Also, the controller module is configured to provide the determination result to the service network via the connection module.

In the seventh aspect of the invention, a method for a proxy server to defer communications between a service network and a mobile communication device is provided. The method comprises the steps of: receiving, from the service network, an operation state of the mobile communication device and a data packet to be transmitted from the service network to the mobile communication device; determining whether to defer the transmission of the data packet according to the operation state and one or more parameters of the data packet; and providing the determination result to the service network.

Other aspects and features of the invention will become apparent to those with ordinary skill in the art upon review of the following descriptions of specific embodiments of the mobile communication device, service network, proxy server, and the method for deferring communications between the service network and the mobile communication device.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Figure 1:
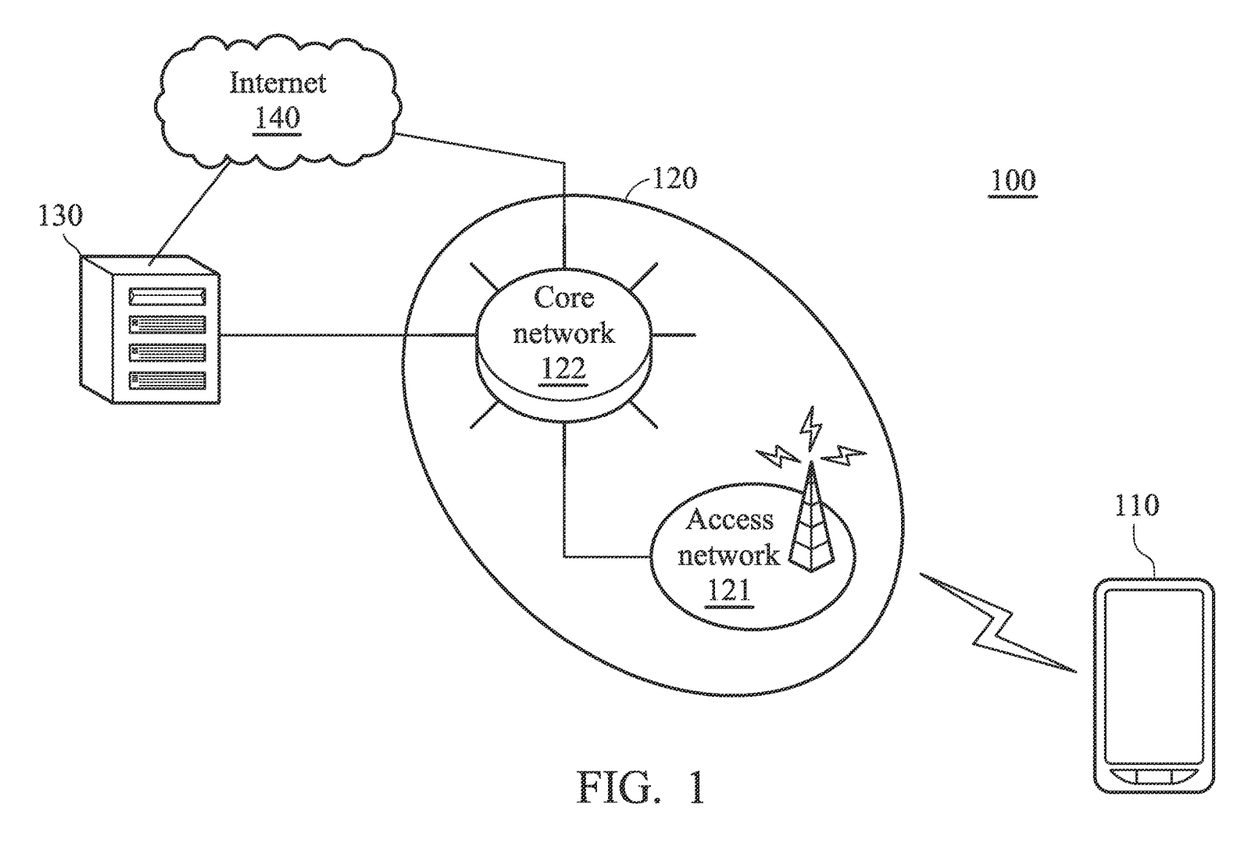
FIG. 1 is a block diagram of a wireless communication environment according to an embodiment of the invention.

FIG. 1 is a block diagram of a wireless communication environment according to an embodiment of the invention. The wireless communication environment 100 comprises a mobile communication device 110, a service network 120, a proxy server 130, and the Internet 140, wherein the mobile communication device 110 is wirelessly connected to the service network 120 for obtaining mobile services, including voice and/or data services. The mobile communication device 110 may be a feature phone, a smartphone, a panel Personal Computer (PC), a laptop computer, or any computing device supporting the wireless technology utilized by the service network 120. The service network 120 may be a 3rd Generation Partnership Project (3GPP) system, such as a GSM/GPRS/EDGE system, a WCDMA system, a CDMA-2000 system, a TD-SCDMA system, a WiMAX system, or an LTE/LTE-A/TD-LTE system. The proxy server 130 may be an intermediary server between the service network 120 and the Internet 140, which may comprise a connection module (not shown) for providing communications with the service network 120, and a controller module (not shown) for classifying the incoming data packets to the service network 120 and determining the deferring policies for different data packets.

To further clarify, the service network 120 comprises an access network 121 and a core network 122, wherein the access network 121 is responsible for processing radio signals, terminating radio protocols, and connecting the mobile communication device 110 with the core network 122, while the core network 122 is responsible for performing mobility management, network-side authentication, and interfaces with public networks, e.g., the Internet 140. The access network 121 may comprise at least a cellular station for providing the functionality of wireless transceiving for the service network 120. Alternatively, the access network 121 may further comprise a cellular station controller for controlling the operation of the cellular station, or the cellular station controller may be incorporated into the cellular station.

For example, if the service network 120 is a GSM/GPRS/EDGE/WCDMA system, the access network 121 may be a Base Station Subsystem (BSS) which includes at least a Base Transceiver Station (BTS) and a Base Station Controller (BSC), and the core network 122 may be a GPRS core which includes a Home Location Register (HLR), at least one Serving GPRS Support Node (SGSN), at least one Gateway GPRS Support Node (GGSN). Alternatively, if the service network 120 is an LTE/LTE-A/TD-LTE system, the access network 121 may be an Evolved-UTRAN (E-UTRAN) which includes at least an evolved NB (eNB), and the core network 122 may be an Evolved Packet Core (EPC) which includes a Home Subscriber Server (HSS), Mobility Management Entity (MME), Serving Gateway (S-GW), Packet Data Network Gateway (PDN-GW or P-GW).

Figure 2:
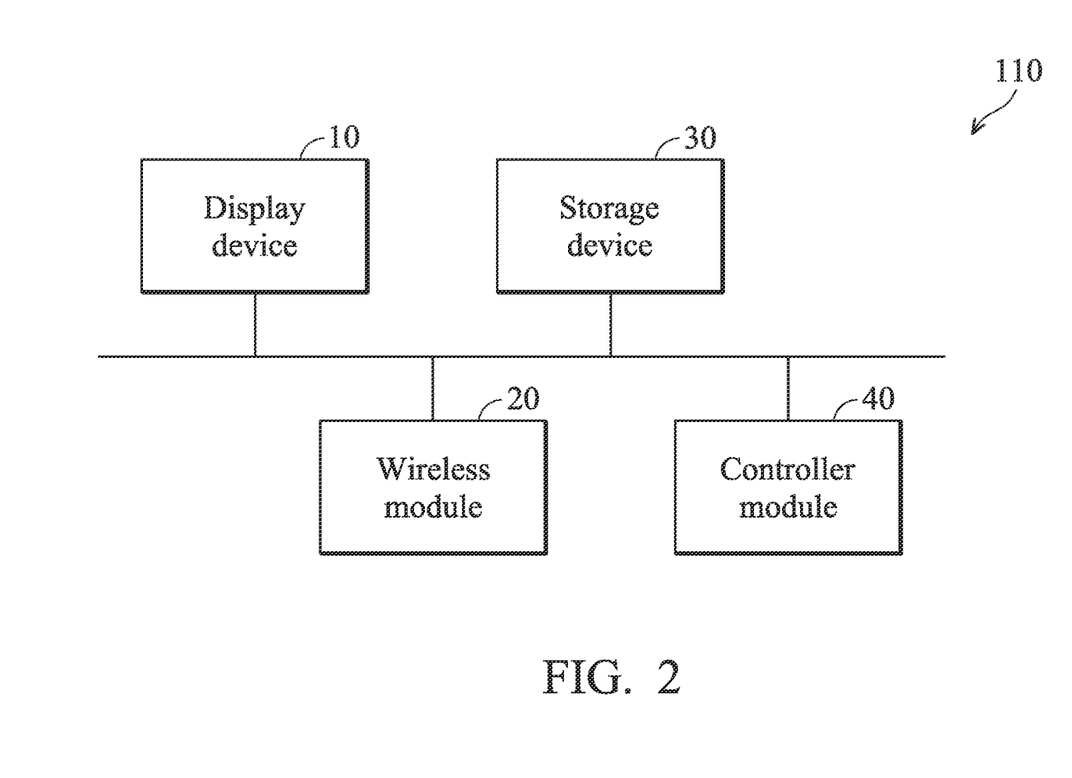
FIG. 2 is a block diagram illustrating the mobile communication device 110 according to an embodiment of the invention.

FIG. 2 is a block diagram illustrating the mobile communication device 110 according to an embodiment of the invention. A mobile communication device 110 comprises a display device 10, a wireless module 20, a storage device 30, and a controller module 40. The display device 10 may be a Liquid-Crystal Display (LCD), Light-Emitting Diode (LED) display, or Electronic Paper Display (EPD), etc., for providing display functionality. Alternatively, the display device 10 may further comprise one or more touch sensors disposed thereon or thereunder for sensing touches, contacts, or approximations of objects, such as fingers or styluses.

The wireless module 20 is responsible for performing the functionality of wireless transmission and reception to and from the service network 120. For example, the wireless module 20 may comprise an antenna, a Radio Frequency (RF) unit, and a baseband unit. The baseband unit performs baseband signal processing, including analog-to-digital conversion (ADC)/digital-to-analog conversion (DAC), gain adjusting, modulation/demodulation, encoding/decoding, and so on. The RF unit receives RF wireless signals via the antenna, converts the received RF wireless signals to baseband signals, which are processed by the baseband unit, or receives baseband signals from the baseband unit and converts the received baseband signals to RF wireless signals, which are later transmitted via the antenna. The operative radio frequency may be 900 MHz, 1800 MHz, or 1900 MHz utilized in the GPRS/GPRS/EDGE technology, or 900 MHz, 1900 MHz, or 2100 MHz utilized in WCDMA technology, or 900 MHz, 2100 MHz, or 2.6 GHz utilized in LTE/LTE-A/TD-LTE technology, or other radio frequencies depending on the wireless technology in use.

The storage device 30 may be a memory (e.g., Random Access Memory (RAM), Flash memory, or Non-Volatile Random Access Memory (NVRAM), etc.), a magnetic storage device (e.g., magnetic tape or hard disk), an optical storage device (e.g., Compact Disc Read-Only Memory (CD-ROM)), or any combination thereof for storing instructions and/or program codes of applications and/or communication protocols, and buffering the deferred data packets.

The controller module 40 may be a general-purpose processor, a Micro-Control Unit (MCU), an application processor, a Digital Signal Processor (DSP), or the like, which provides the function of data processing and computing, and controls the operation of the display device 10 and the wireless module 20, and loads and executes a series of instructions and/or program codes from the storage device 30 to perform the method for deferring communications with the service network 120. In another embodiment, the controller module 40 may be an MCU of a baseband chip that is incorporated in the wireless module 20.

Although not shown, the mobile communication device 110 may further comprise other functional units, such as an Input/Output (I/O) device (e.g., button, keyboard, mouse, touch pad, etc.), a power supply, and a firewall module for identifying suspicious activity, etc., and the invention is not limited thereto.

Figure 3:
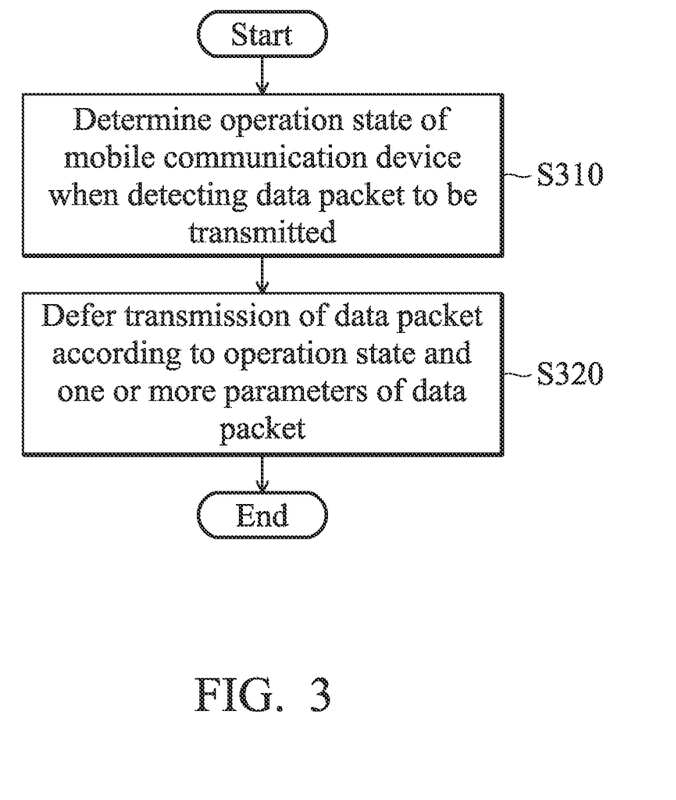
FIG. 3 is a flow chart illustrating the method for deferring communications between a mobile communication device and a service network according to an embodiment of the invention.

FIG. 3 is a flow chart illustrating the method for deferring communications between a mobile communication device and a service network according to an embodiment of the invention. In this embodiment, the method may be applied to the mobile communication device or the service network. To begin, the service network or the mobile communication device determines the operation state of the mobile communication device when detecting a data packet to be transmitted from the service network to the mobile communication device or from the mobile communication device to the service network (step S310), and then defers the transmission of the data packet according to the operation state and one or more parameters of the data packet (step S320).

Specifically, the transmission of the data packet is deferred when the operation state indicates that the mobile communication device operates in the low-power state or operates in an active state but is soon to enter the low-power state, and the parameters indicate that the data packet has a low priority or relates to suspicious activity. The low-power state refers to a state wherein the mobile communication device operates at a low power level, and the active state refers to a state wherein the mobile communication device operates at a high power level.

For example, the low-power state may be an idle state, such as the RRC_IDLE state, or the Discontinuous Reception (DRX) OFF state (i.e., the operation state for DRX OFF durations), while the active state may be the RRC_CONNECTED state or the DRX ON state (i.e., the operation state for DRX ON durations).

The parameters of the data packet may include any combination of the following: 1) the Quality of Service (QoS) Class Identifier (QCI); 2) the Allocation and Retention Priority (ARP); 3) the source identifier (e.g., source IP address); 4) the destination identifier (e.g., destination IP address, IP address of the proxy server of the destination, or International Mobile Subscriber Identity (IMSI) of the destination); 5) the application type (e.g., voice call or Voice over IP (VoIP)); 6) domain type (e.g., Packet Switched (PS) domain or Circuit Switched (CS) domain); and 7) the history of previous transmissions of data packets.

For example, a data packet with a higher QCI or ARP may be classified as a high-priority data packet, while a data packet with a lower QCI or ARP may be classified as a low-priority data packet. A data packet associated with the CS domain may be classified as a high-priority data packet, while a data packet associated with the PS domain may be classified as a low-priority data packet. A data packet associated with a delay-sensitive application (e.g., voice call or VoIP) may be classified as a high-priority data packet, while a data packet associated with the delay-tolerant application (e.g., Machine-to-Machine (M2M) communications) or with the applications that transmit small data traffic (e.g., keep-alive messages, status-update messages, or query messages) may be classified as a low-priority data packet. A data packet associated with suspicious traffic patterns may be determined to relate to a suspicious activity (e.g., a DoS flooding attack, port scanning attack, or battery draining attack), wherein the suspicious traffic patterns may be determined using any known firewall rule(s) according to the source identifier, the destination identifier, and/or the history of previous transmissions. Please note that, detailed description of the firewall rule(s) is omitted herein as it is beyond the scope of the invention.

To elaborate, the method may be applied to an access network entity (e.g., an eNB), or one or more core network entities (e.g., a P-GW, S-GW, and MME) in the service network. For example, if the mobile communication device operates in an idle state, the method may be applied to the P-GW or S-GW in the service network, wherein the P-GW or S-GW buffers the data packet to be transmitted according to a deferring timer, and triggers/resumes control plane actions (e.g. paging procedures) in MME when the deferring timer expires. Alternatively, if the mobile communication device operates in an idle state, the method may be applied to the S-GW and MME in the service network, wherein the S-GW buffers the data packet to be transmitted according to a deferring timer, and the MME suspends the paging procedure associated with the deferred data packet until the deferring timer expires. If the mobile communication device operates in a connected state, the method may be applied to the eNB in the service network, wherein the eNB suspends the scheduling of the transmission of the data packet according to a deferring timer, and resumes the scheduling of the transmission of the data packet when the deferring timer expires.

Alternatively, the method may be applied to a proxy server external to the service network, which receives, from the service network, the operation state of the mobile communication device and the data packet to be transmitted to the mobile communication device, and determines whether to defer the transmission of the data packet according to the operation state and one or more parameters of the data packet (similar to step S320 in FIG. 3). After that, the proxy server provides the determination result to the service network, and then the service network proceeds to handle the data packet according to the determination result. That is, the service network defers the transmission of the data packet if the determination result indicates so. Otherwise, the service network immediately transmits the data packet if the determination result indicates that the transmission of the data packet is not to be deferred.

As to how long the deferring should last, embodiments will be described as follows with respect to FIGS. 4~7.

Figure 4:
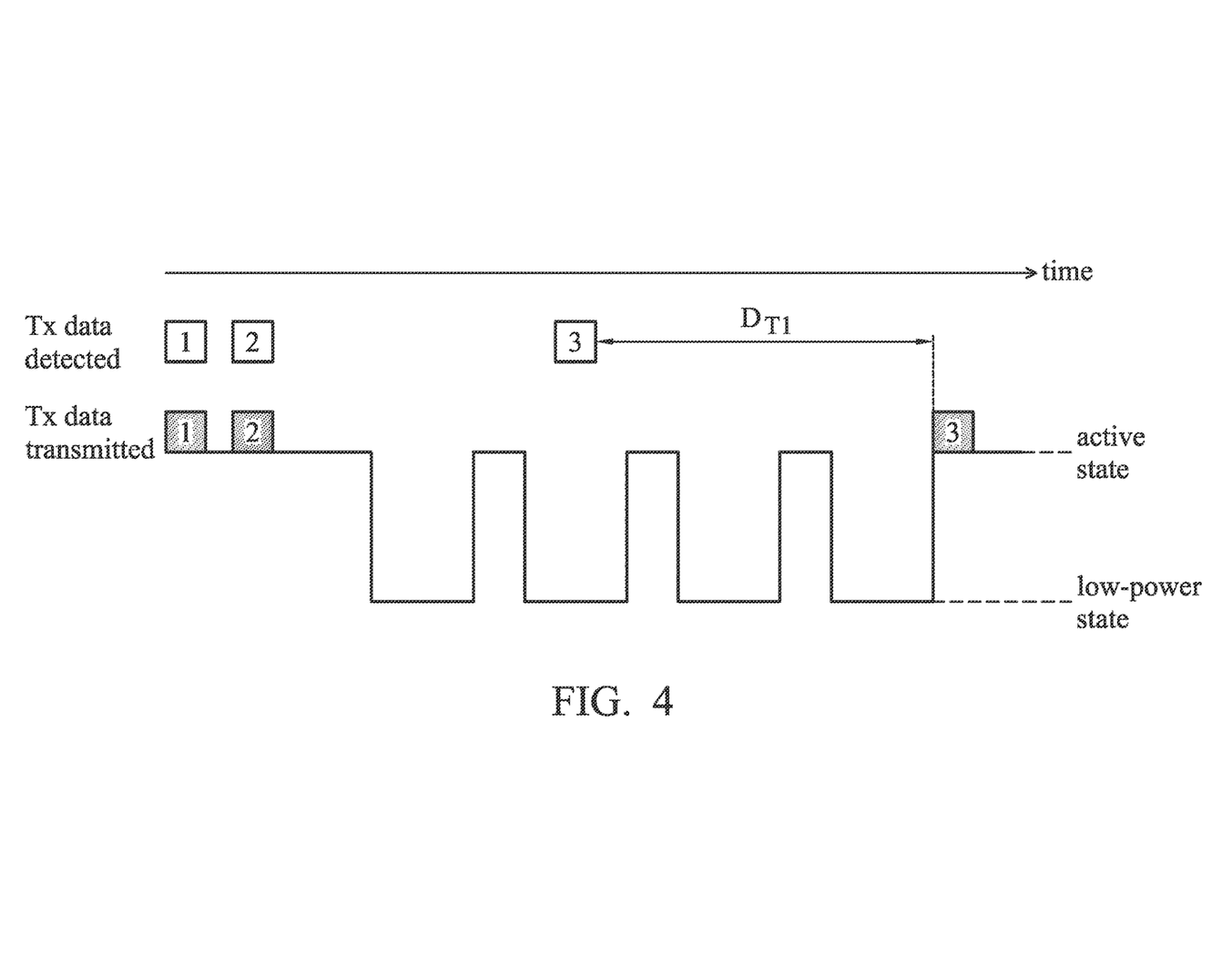
FIG. 4 is a schematic diagram illustrating the deferring of the transmission of a data packet for a predetermined period of time.

FIG. 4 is a schematic diagram illustrating the deferring of the transmission of a data packet for a predetermined period of time. As shown in FIG. 4, the first two data packets to be transmitted are detected (denoted as Tx data detected) when the mobile communication device is in the active state, so the first two data packets are transmitted immediately (denoted as Tx data transmitted). Later, the third data packet to be transmitted is detected when the mobile communication device is in the low-power state, so the transmission of the third data packet is deferred for a predetermined period of time (denoted as $D_{T1}$). After waiting the predetermined period of time, the third data packet is transmitted. In one embodiment, a deferring timer may be started to count the predetermined period of time when detecting the third data packet, and the deferring timer may be configured to expire when the mobile communication device is in the active state, or if the deferring timer expires when the mobile communication device is in the low-power state, the predetermined period of time to be counted by the deferring timer may be prolonged to the next time the mobile communication device enters the active state.

Figure 5:
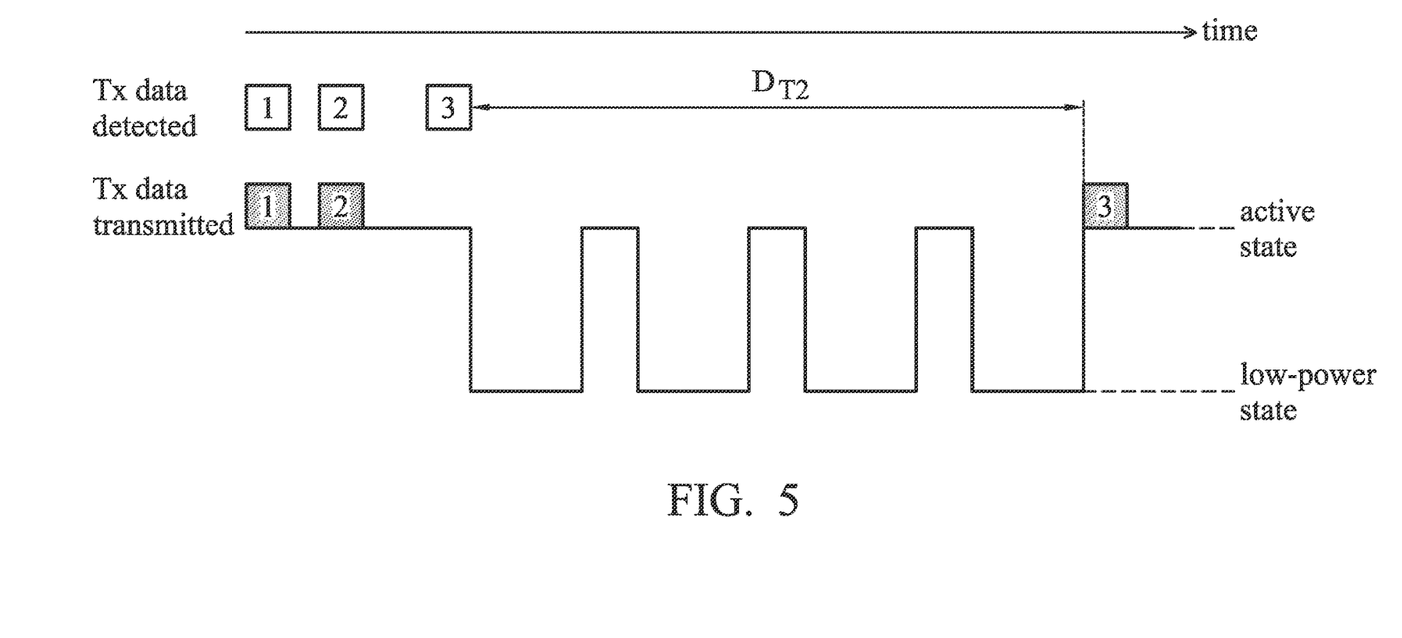
FIG. 5 is another schematic diagram illustrating the deferring of the transmission of a data packet for a predetermined period of time.

FIG. 5 is another schematic diagram illustrating the deferring of the transmission of a data packet for a predetermined period of time. As shown in FIG. 5, the first two data packets to be transmitted are detected when the mobile communication device is in the active state and is far from entering the low-power state, so the first two data packets are transmitted immediately. Later, the third data packet to be transmitted is detected when the mobile communication device is still in the active state but is soon to enter the low-power state (which means that there is not enough time to finish the transmission of the third data packet before entering the low-power state), so the transmission of the third data packet is deferred for a predetermined period of time (denoted as $D_{T2}$). After waiting the predetermined period of time, the third data packet is transmitted. Similarly, a deferring timer may be used to count the predetermined period of time.

Figure 6:
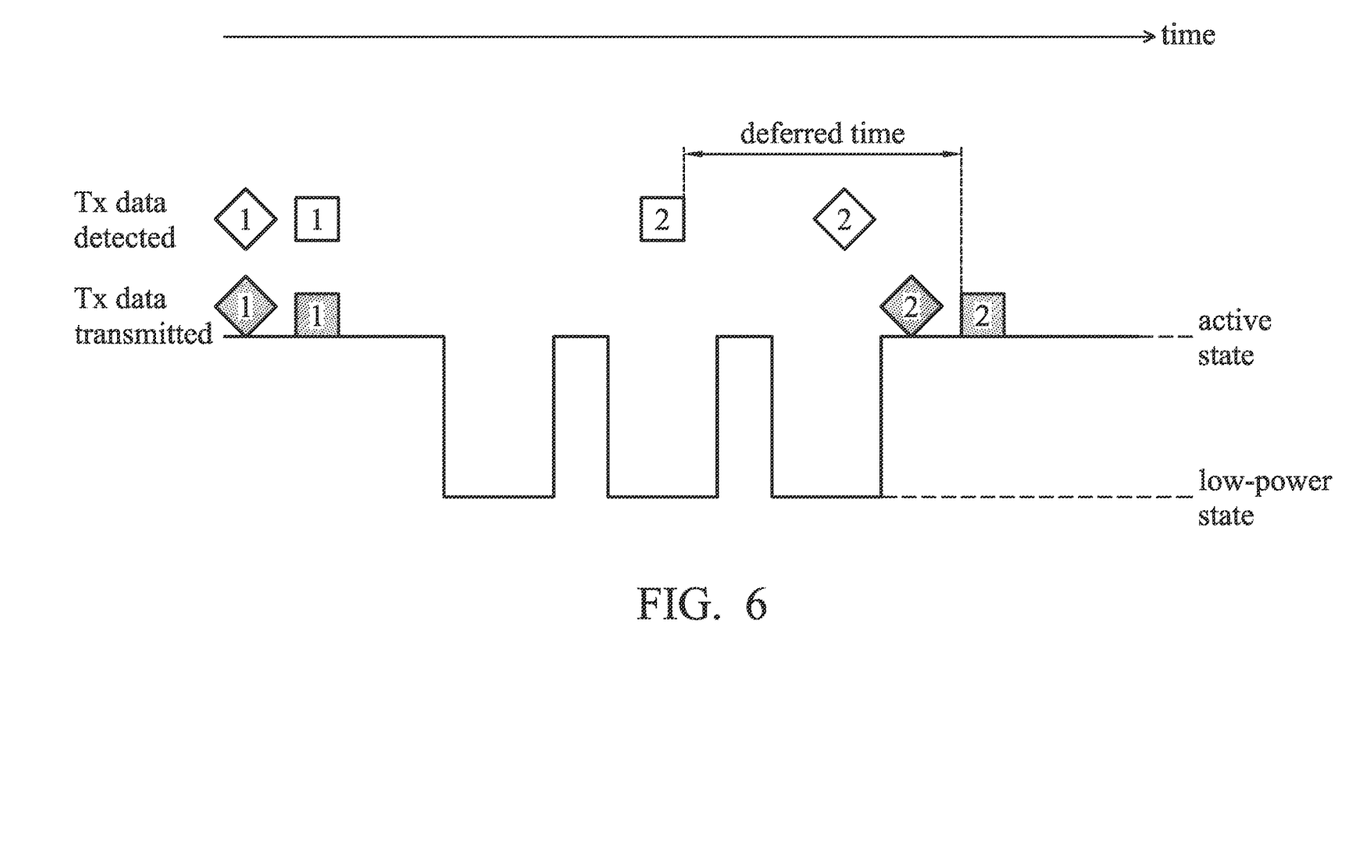
FIG. 6 is a schematic diagram illustrating the deferring of the transmission of a low-priority or suspicious data packet until the detection of a high-priority or non-suspicious data packet to be transmitted.

FIG. 6 is a schematic diagram illustrating the deferring of the transmission of a low-priority or suspicious data packet until the detection of a high-priority or non-suspicious data packet to be transmitted. As shown in FIG. 6, high-priority or non-suspicious data packets are denoted with a diamond shape, while the low-priority or suspicious data packets are denoted with a square shape. The first high-priority or non-suspicious data packet and the first low-priority or suspicious data packet to be transmitted are detected when the mobile communication device is in the active state, so the two data packets are transmitted immediately. Later, the second low-priority or suspicious data packet to be transmitted is detected when the mobile communication device is in the low-power state, so the transmission of the second low-priority or suspicious data packet is deferred until the next high-priority or non-suspicious data packet to be transmitted is detected. Specifically, the second high-priority or non-suspicious data packet to be transmitted is detected when the mobile communication device is still in the low-power state, so the mobile communication device subsequently enters the active state to transmit the second high-priority or non-suspicious data packet. After transmitting the high-priority or non-suspicious data packet, the mobile communication device remains in the active state to transmit the second low-priority or suspicious data packet.

Figure 7:
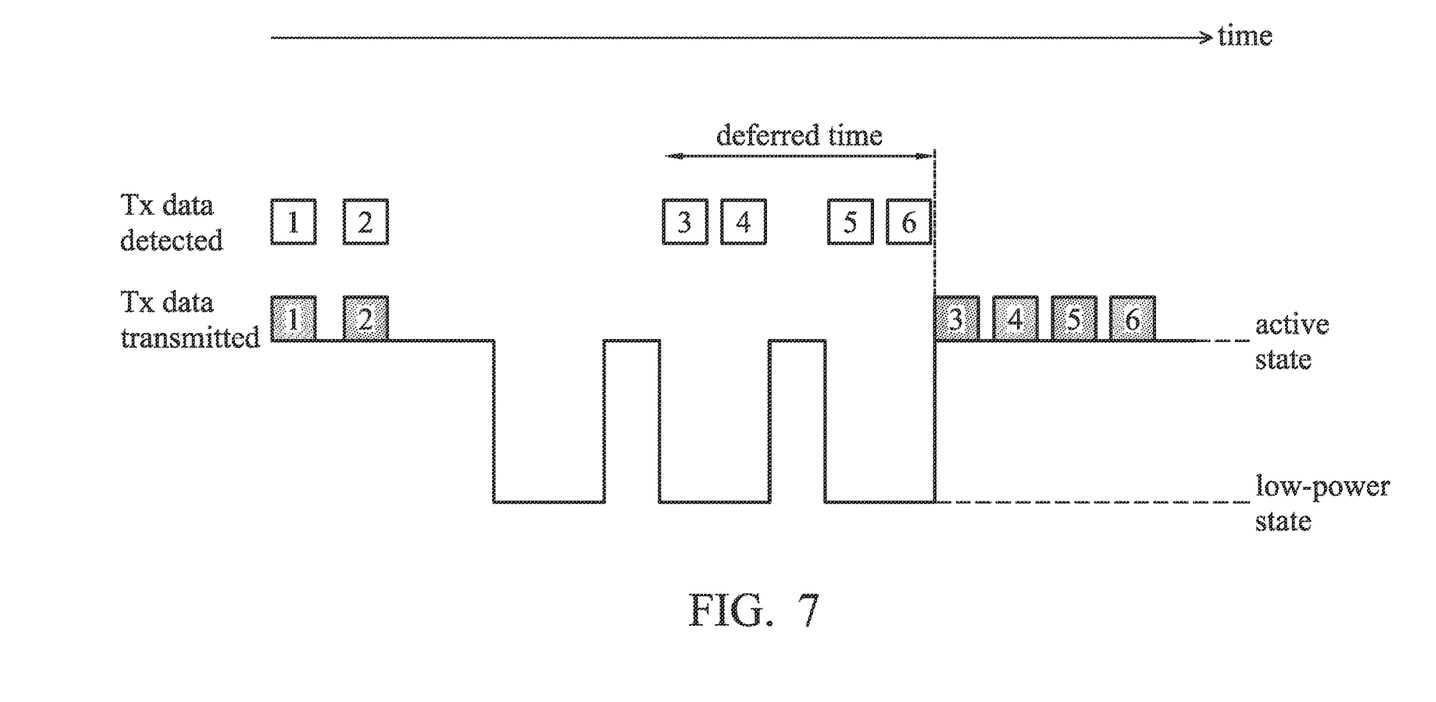
FIG. 7 is a schematic diagram illustrating the deferring of the transmission of a data packet until a predetermined number of deferred data packets have accumulated.

FIG. 7 is a schematic diagram illustrating the deferring of the transmission of a data packet until a predetermined number of deferred data packets have accumulated. As shown in FIG. 7, the first two data packets to be transmitted are detected when the mobile communication device is in the active state, so the first two data packets are transmitted immediately. Later, the subsequent data packets to be transmitted are detected when the mobile communication device is in the low-power state, so the transmissions of the subsequent data packets are deferred until a predetermined number (i.e., 4 in this case) of deferred data packets have accumulated. That is, after detecting the sixth data packet to be transmitted in the low-power state, the mobile communication device subsequently enters the active state to transmit the deferred data packets (i.e., the third to sixth data packets).

Figure 8:
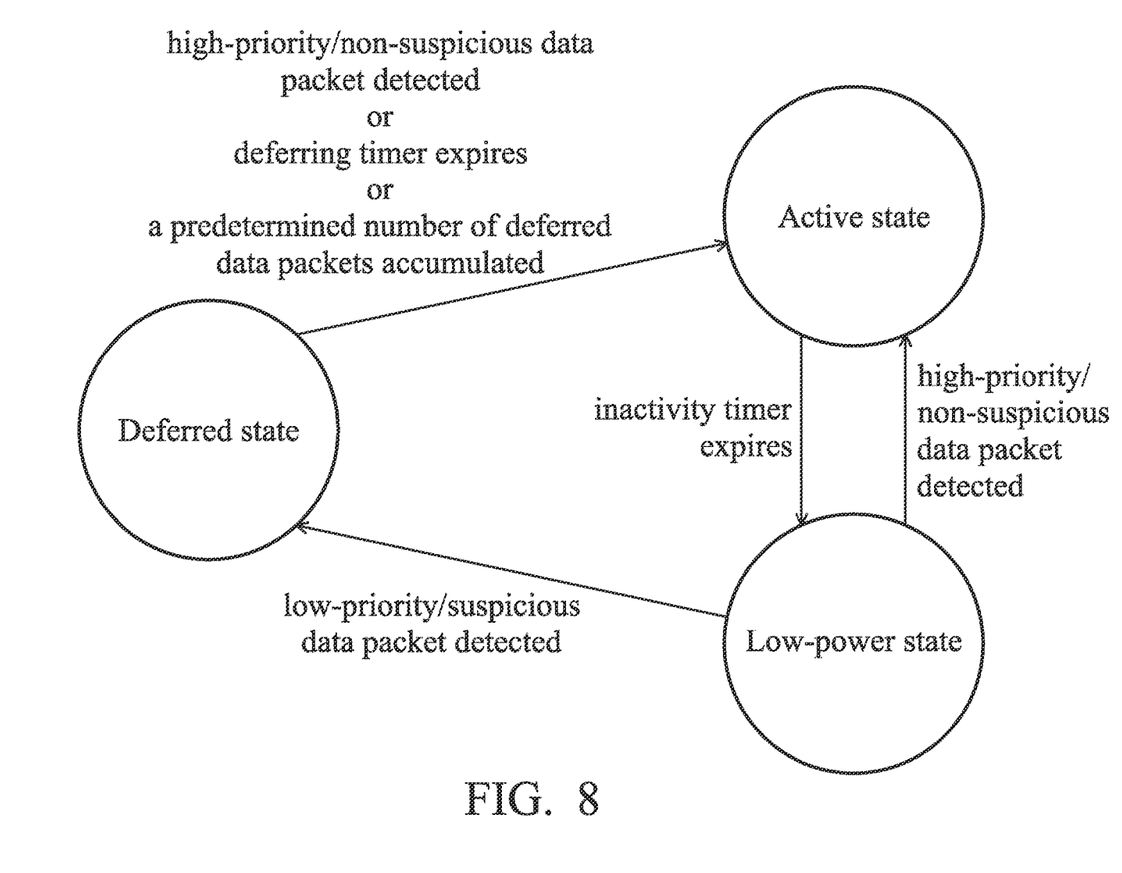
FIG. 8 is a state transition diagram illustrating the operation state of a mobile communication device according to an embodiment of the invention.

FIG. 8 is a state transition diagram illustrating the operation state of a mobile communication device according to an embodiment of the invention. As shown in FIG. 8, in addition to the active state and the low-power state, an additional state called "deferred state" is introduced to represent the state in which data packet(s) to be transmitted is/are deferred. When a low-priority or suspicious data packet to be transmitted is detected while the mobile communication device operates in the low-power state, the low-priority or suspicious data packet is deferred according a deferring timer and the operation state transits to the deferred state. When a high-priority or non-suspicious data packet to be transmitted is detected, or the deferring timer expires, or a predetermined number of deferred data packets have accumulated while the mobile communication device operates in the deferred state, the operation state transits to the active state to transmit the high-priority or non-suspicious data packet (if detected) and the deferred data packet(s).

When a high-priority or non-suspicious data packet to be transmitted is detected while the mobile communication device operates in the low-power state, the operation state transits to the active state to transmit the high-priority or non-suspicious data packet. When the inactivity timer expires while the mobile communication device operates in the active state, the operation state transits to the low-power state. Specifically, the inactivity timer is started when the operation state transits to the active state, to count the period of time where the mobile communication device should remain in the active state.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the invention shall be defined and protected by the following claims and their equivalents.

What is claimed is:

1. A mobile communication device, comprising:
   a wireless module, performing wireless transmission and reception to and from a service network; and
   a controller module, determining an operation state of the mobile communication device when detecting a low-priority data packet to be transmitted to the service network via the wireless module, and when the operation state indicates that the mobile communication device operates in an RRC_CONNECTED or DRX ON state but is soon to enter an RRC_IDLE or DRX OFF state and one or more parameters of the low-priority data packet indicate that the low-priority data packet relates to a suspicious activity, deferring transmission of the low-priority data packet until a high-priority data packet to be transmitted is detected.

2. The mobile communication device of claim 1, wherein the parameters comprise at least one of the following:
   a Quality of Service (QoS) Class Identifier (QCI);
   an Allocation and Retention Priority (ARP);
   a source identifier;
   a destination identifier;
   an application type;
   a domain type being a Packet Switched (PS) domain or a Circuit Switched (CS) domain; and
   a history of previous transmissions of data packets.

3. The mobile communication device of claim 1, further comprising:
   a firewall module, determining whether the low-priority data packet relates to the suspicious activity according to one or more firewall rules, and providing the determination result in the parameters.

4. The mobile communication device of claim 1, wherein the transmission of the low-priority data packet is deferred so as to save power or to defend against battery draining attacks.

5. A method for a mobile communication device to defer communications with a service network, comprising:
   determining an operation state of the mobile communication device when detecting a low-priority data packet to be transmitted to the service network; and
   when the operation state indicates that the mobile communication device operates in an RRC_CONNECTED or DRX ON state but is soon to enter an RRC_IDLE or DRX OFF state and one or more parameters of the low-priority data packet indicate that the low-priority data packet relates to a suspicious activity, deferring transmission of the low-priority data packet until a high-priority data packet to be transmitted is detected.

6. The method of claim 5, wherein the parameters comprise at least one of the following:
   a Quality of Service (QoS) Class Identifier (QCI);
   an Allocation and Retention Priority (ARP);
   a source identifier;
   a destination identifier;
   an application type;
   a domain type being a Packet Switched (PS) domain or a Circuit Switched (CS) domain; and
   a history of previous transmissions of data packets.

7. The method of claim 5, further comprising:
   determining whether the low-priority data packet relates to the suspicious activity according to one or more firewall rules; and
   providing the determination result in the parameters.

8. The method of claim 5, wherein the transmission of the low-priority data packet is deferred so as to save power or to defend against battery draining attacks.

9. A service network, comprising:
   an access network, comprising at least a cellular station for performing wireless transmission and reception to and from a mobile communication device; and
   a core network, determining an operation state of the mobile communication device when detecting a low-priority data packet to be transmitted to the mobile communication device via the access network, and when the operation state indicates that the mobile communication device operates in an RRC_CONNECTED or DRX ON state but is soon to enter an RRC_IDLE or DRX OFF state and one or more parameters of the low-priority data packet indicate that the low-priority data packet relates to a suspicious activity, deferring transmission of the low-priority data packet until a high-priority data packet to be transmitted is detected.

10. The service network of claim 9, wherein the parameters comprise at least one of the following:
    a Quality of Service (QoS) Class Identifier (QCI);
    an Allocation and Retention Priority (ARP);
    a source identifier;
    a destination identifier;
    an application type;
    a domain type being a Packet Switched (PS) domain or a Circuit Switched (CS) domain; and
    a history of previous transmissions of data packets.

11. The service network of claim 9, wherein the core network is coupled to an external firewall server for determining whether the low-priority data packet relates to the suspicious activity according to one or more firewall rules and providing the determination result in the parameters.

12. The service network of claim 9, wherein the transmission of the low-priority data packet is deferred so as to save power of the mobile communication device or to defend against battery draining attacks on the mobile communication device.

13. A service network, comprising:
    an access network, comprising at least a cellular station for performing wireless transmission and reception to and from a mobile communication device; and
    a core network, receiving a low-priority data packet to be transmitted to the mobile communication device,
    wherein the access network further determines an operation state of the mobile communication device in response to the core network receiving the low-priority data packet, and when the operation state indicates that the mobile communication device operates in an RRC_CONNECTED or DRX ON state but is soon to enter an RRC_IDLE or DRX OFF state and one or more parameters of the low-priority data packet indicate that the low-priority data packet relates to a suspicious activity, defers transmission of the low-priority data packet until a high-priority data packet to be transmitted is detected.

14. The service network of claim 13, wherein the parameters comprise at least one of the following:
    a Quality of Service (QoS) Class Identifier (QCI);
    an Allocation and Retention Priority (ARP);
    a source identifier;
    a destination identifier;
    an application type;
    a domain type being a Packet Switched (PS) domain or a Circuit Switched (CS) domain; and
    a history of previous transmissions of data packets.

15. The service network of claim 13, wherein the core network is connected to an external firewall server for determining whether the low-priority data packet relates to the suspicious activity according to one or more firewall rules and providing the determination result in the parameters.

16. The service network of claim 13, wherein the transmission of the low-priority data packet is deferred so as to save power of the mobile communication device or to defend against battery draining attacks on the mobile communication device.

17. A method for a service network to defer communications with a mobile communication device, comprising:
    determining an operation state of the mobile communication device when detecting a low-priority data packet to be transmitted to the mobile communication device; and
    when the operation state indicates that the mobile communication device operates in an RRC_CONNECTED or DRX ON state but is soon to enter an RRC_IDLE or DRX OFF state and one or more parameters of the low-priority data packet indicate that the low-priority data packet relates to a suspicious activity, deferring transmission of the low-priority data packet until a high-priority data packet to be transmitted is detected.

18. The method of claim 17, wherein the parameters comprise at least one of the following:
    a Quality of Service (QoS) Class Identifier (QCI);
    an Allocation and Retention Priority (ARP);
    a source identifier;
    a destination identifier;
    an application type;
    a domain type being a Packet Switched (PS) domain or a Circuit Switched (CS) domain; and
    a history of previous transmissions of data packets.

19. The method of claim 17, wherein the service network is connected to an external firewall server for determining whether the low-priority data packet relates to the suspicious activity according to one or more firewall rules and providing the determination result in the parameters.

20. The method of claim 17, wherein the transmission of the low-priority data packet is deferred so as to save power or to defend against battery draining attacks on the mobile communication device.

21. A proxy server, comprising:
    a connection module, providing communications with a service network which is wirelessly connected to a mobile communication device; and
    a controller module, receiving, from the service network via the connection module, an operation state of the mobile communication device and a low-priority data packet to be transmitted from the service network to the mobile communication device, determining whether to defer the transmission of the low-priority data packet according to the operation state and one or more parameters of the low-priority data packet, and providing the determination result to the service network via the connection module,
    wherein the transmission of the low-priority data packet is determined to be deferred until a high-priority data packet to be transmitted is detected, when the operation state indicates that the mobile communication device operates in an RRC_CONNECTED or DRX ON state but is soon to enter an RRC_IDLE or DRX OFF state and the parameters indicate that the low-priority data packet relates to a suspicious activity.

22. The proxy server of claim 21, wherein the parameters comprise at least one of the following:
    a Quality of Service (QoS) Class Identifier (QCI);
    an Allocation and Retention Priority (ARP);
    a source identifier;
    a destination identifier;
    an application type;
    a domain type being a Packet Switched (PS) domain or a Circuit Switched (CS) domain; and
    a history of previous transmissions of data packets.

23. The proxy server of claim 21, wherein the controller module further determines whether the low-priority data packet relates to the suspicious activity according to one or more firewall rules, and provides the determination result of whether the low-priority data packet relates to the suspicious activity in the parameters.

24. The proxy server of claim 21, wherein the transmission of the low-priority data packet is deferred so as to save power of the mobile communication device or to defend against battery draining attacks on the mobile communication device.

25. A method for a proxy server to defer communications between a service network and a mobile communication device, comprising:
    receiving, from the service network, an operation state of the mobile communication device and a low-priority data packet to be transmitted from the service network to the mobile communication device;
    determining whether to defer the transmission of the low-priority data packet according to the operation state and one or more parameters of the low-priority data packet,
    wherein the transmission of the low-priority data packet is determined to be deferred until a high-priority data packet to be transmitted is detected, when the operation state indicates that the mobile communication device operates in an RRC_CONNECTED or DRX ON state but is soon to enter an RRC_IDLE or DRX OFF state and the parameters indicate that the low-priority data packet relates to a suspicious activity; and
    providing the determination result to the service network.

26. The method of claim 25, wherein the parameters comprise at least one of the following:
    a Quality of Service (QoS) Class Identifier (QCI);
    an Allocation and Retention Priority (ARP);
    a source identifier;
    a destination identifier;
    an application type;
    a domain type being a Packet Switched (PS) domain or a Circuit Switched (CS) domain; and
    a history of previous transmissions of data packets.

27. The method of claim 25, further comprising:
    determining whether the low-priority data packet relates to the suspicious activity according to one or more firewall rules; and
    providing the determination result of whether the low-priority data packet relates to the suspicious activity in the parameters.

28. The method of claim 25, wherein the transmission of the low-priority data packet is deferred so as to save power of the mobile communication device or to defend against battery draining attacks on the mobile communication device.

* * * * *